Dec. 5, 1939.　　　J. H. SHERTS ET AL　　　2,182,358
APPARATUS FOR MAKING SAFETY GLASS
Original Filed Dec. 22, 1934　　4 Sheets-Sheet 1

INVENTORS
JAMES H. SHERTS AND
BROOK J. DENNISON
BY
Bradley + Bu
ATTORNEYS.

Dec. 5, 1939.   J. H. SHERTS ET AL   2,182,358
APPARATUS FOR MAKING SAFETY GLASS
Original Filed Dec. 22, 1934   4 Sheets-Sheet 2

INVENTORS
JAMES H. SHERTS AND
BROOK J. DENNISON
BY
Bradley & Bee
ATTORNEYS.

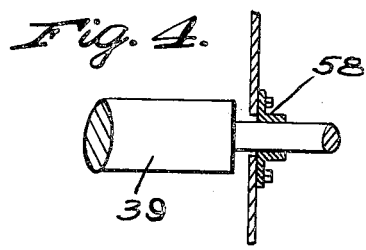
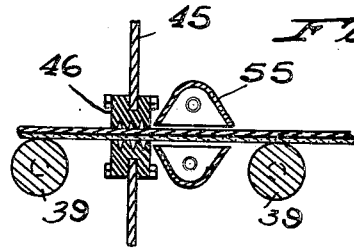
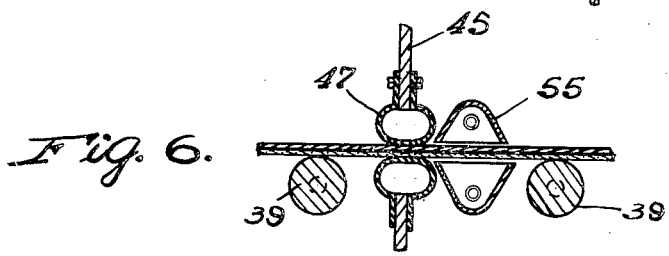
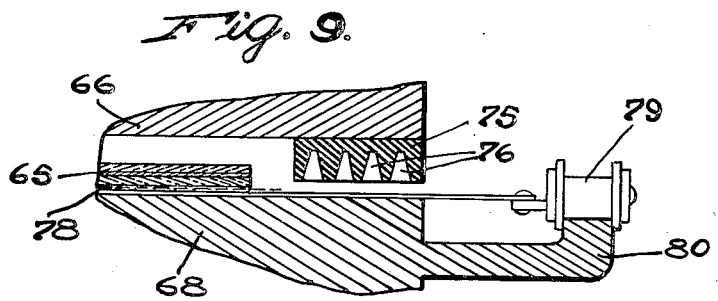
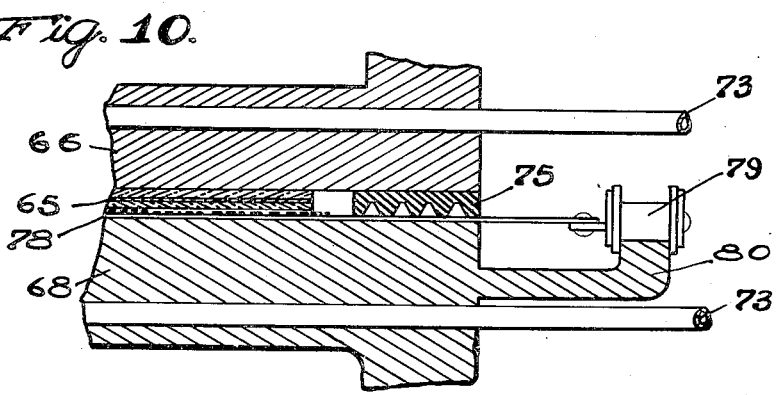

Dec. 5, 1939.   J. H. SHERTS ET AL   2,182,358
APPARATUS FOR MAKING SAFETY GLASS
Original Filed Dec. 22, 1934    4 Sheets-Sheet 4

INVENTOR.
JAMES H. SHERTS AND
BROOK J. DENNISON
BY
ATTORNEYS.

Patented Dec. 5, 1939

2,182,358

UNITED STATES PATENT OFFICE 2,182,358

APPARATUS FOR MAKING SAFETY GLASS

James H. Sherts and Brook J. Dennison, Tarentum, Pa., assignors, by mesne assignments, to Pittsburgh Plate Glass Company, a corporation of Pennsylvania Original application December 22, 1934, Serial No. 758,786. Divided and this application January 20, 1938, Serial No. 185,887

7 Claims. (Cl. 18—17)

The invention relates to apparatus for making safety glass, and the present application constitutes a division of our application, Serial No. 758,786, filed December 22, 1934 which has since matured into United States Patent No. 2,106,766, issued February 1, 1938. The present invention is directed to the making of laminated glass which ordinarily comprises a pair of glass sheets or plates secured to the opposite sides of a sheet of reinforcing material, such as a synthetic resin, or a cellulosic derivative.

The invention is hereinafter described in connection with a vinyl resin, such as vinyl acetal, or vinyl chlor acetate, but it will be understood that the invention is of broad application and may be used with many other resins, such as the glyptals, toluene sulfonamide derivatives and the like.

The primary object of the present invention is the provision of apparatus which will enable a plasticized resin in divided or powdered form to be incorporated directly into a laminated glass, without the use of a solvent or the necessity of preforming the resins into sheets.

A further object of our invention is the provision of an apparatus adapted to the continuous production of safety glass to reduce labor and operating costs and to give a high volume of production in a limited factory area.

Other objects and advantages of our invention will become more apparent from the following detailed description and illustrative drawings of certain preferred embodiments thereof.

Figure 1:
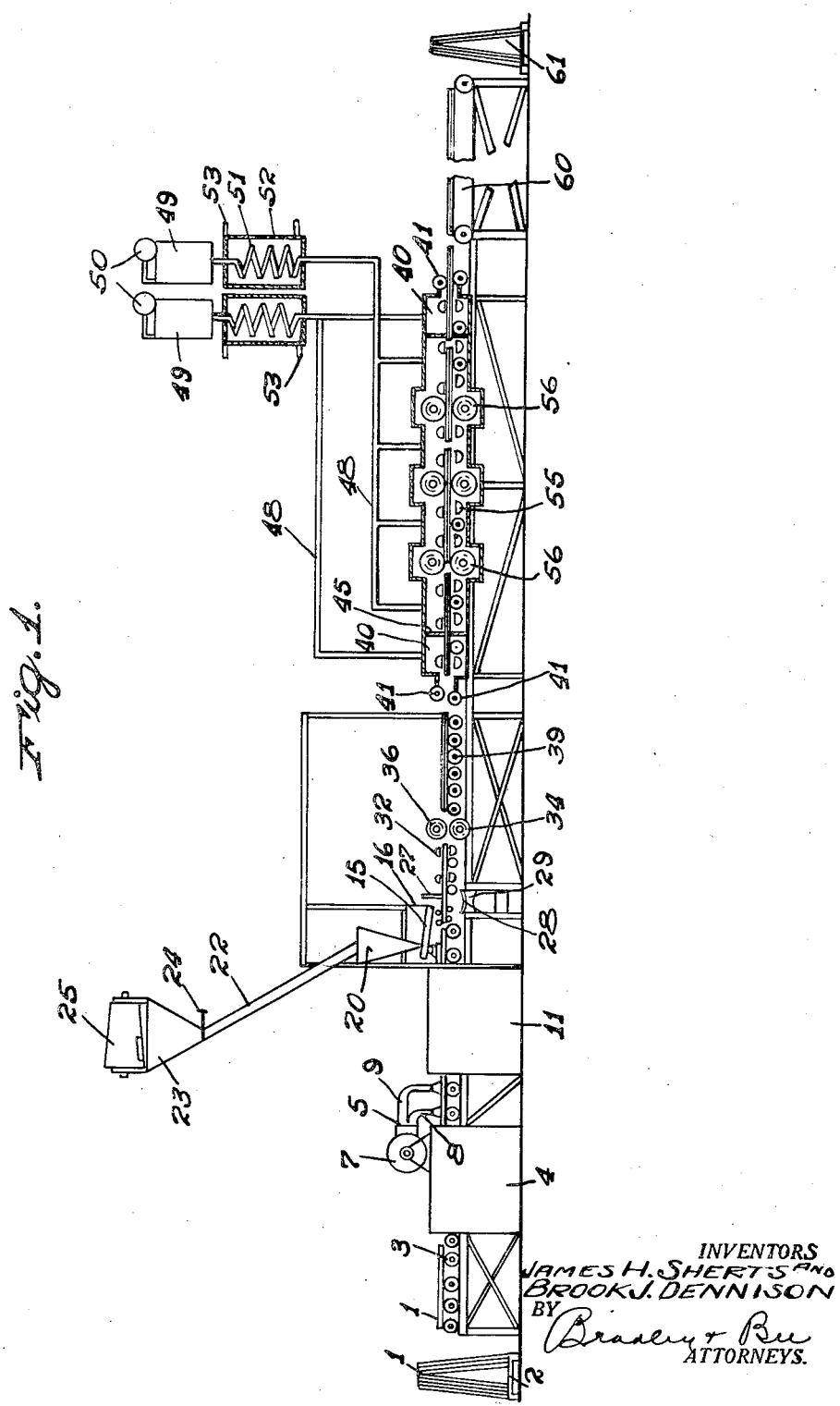
Figure 2:
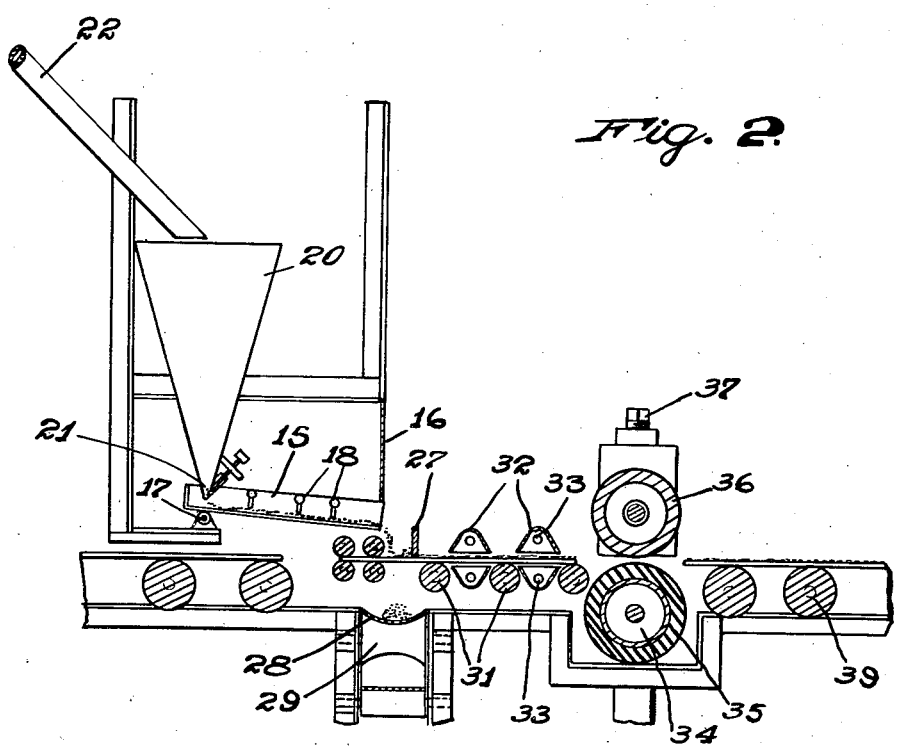
Figure 3:
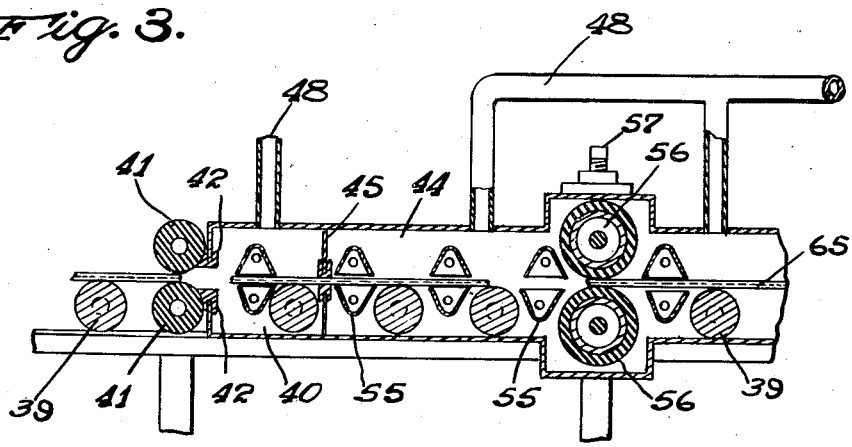
Figure 7:
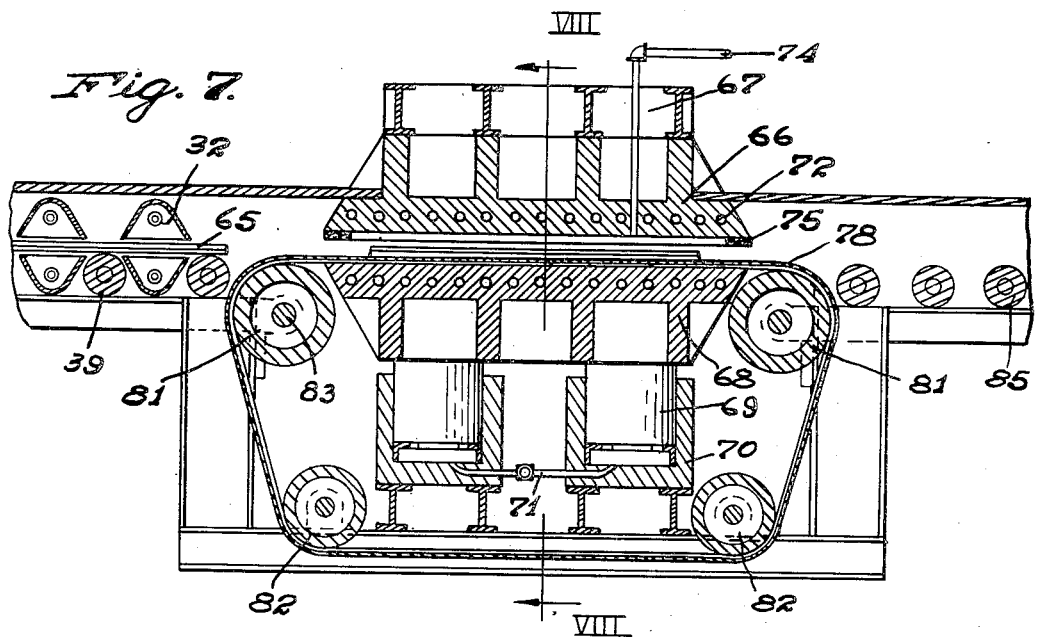
Figure 8:
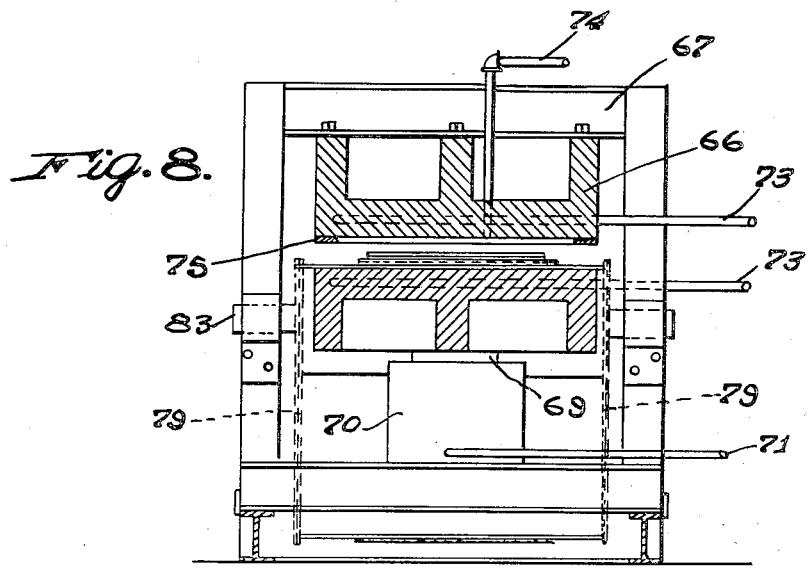

In the drawings: Figure 1 is a side elevation partially in section of the complete apparatus. Figures 2 and 3 are enlarged sections through portions of the apparatus shown in Figure 1. Figures 4 and 5 are detailed views on an enlarged scale relating to the construction of Figure 1. Figure 6 is a detailed view of a modification. Figures 7 and 8 are sections through a modification, Figure 7 being a section on the line VII—VII of Figure 8 and Figure 8 being a section on the line VIII—VIII of Figure 7. Figures 9 and 10 are enlarged sectional views relating to the construction of Figures 7 and 8.

Referring to the apparatus shown in Figures 1-5, glass plates 1 which are to be laminated are contained upon a rack 2 positioned adjacent the apparatus. The glass plates 1 are transferred to a conveyor 3 by means of which they are transported through a washer 4 in which the plates are cleaned. Upon leaving the washer 4, the plates 1 pass under a dryer 5 which may be of any desired form and includes a driven fan blower 7, as shown, with conduits 8 and 9 arranged so that air is discharged through the conduit 8 and exhausted through the conduit 9. The glass plates are then advanced through a heating oven 11 in which the plates are raised to a relatively high temperature in order to promote the adhesion of the reinforcing material thereto.

After the plates 1 have passed through this preliminary treatment they are in condition to receive the reinforcing material. The apparatus by means of which this material is applied is shown most clearly in Figure 2 wherein the resin is discharged from an inclined pan 15 suspended at its forward end upon a flexible member 16, and raised at its rear end upon a driven eccentric 17. This permits the pan to be given an oscillating movement in a vertical plane and promotes the flow of powdered resin therethrough. Levelling scrapers 18 are preferably provided in the pan 15 with their lower edges near the bottom of the pan in order to promote the spreading of the powdered resin into a layer of uniform thickness across the entire width of the pan. The front end of the pan 15 discharges upon the glass plates as they pass therebeneath. The powdered resin is discharged from a hopper 20 into the pan 15, a control gate 21 being provided to regulate this flow. The hopper 20 is fed through a pipe 22 connected to a hopper 23, a suitable valve 24 being provided to control the flow of the resin through the pipe 22. The hopper 23 receives the powdered resin being discharged from a mixer 25 in which the resin and plasticizer are blended together.

As the powdered resin falls upon the glass plates 1, it is evenly distributed thereover by means of a cross scraper 27 which also permits a control of the thickness of the resin layer. In order to facilitate the action of the scraper 27, suitable means (not shown) are provided for giving the scraper an oscillating movement in a horizontal plane. Any excess resin which is scraped from the plates or which falls between successive plates is collected upon a concave cross feed belt 28 which passes around suitable driven pulleys 29 and discharges into a receptacle (not shown).

After the glass plates have passed the scraper 27 they are carried by conveyor rolls 31 past reflectors 32 carrying heating elements 33. The application of this heat softens the plasticized resin particles so that they will adhere together and to the heated glass plates. The glass plates are then passed over a roll 34 having a soft surface covering 35 and beneath a polishing metal roll 36 which applies an adjustable pressure to the resin layer and compacts it into a smooth coat or film of uniform thickness. The pressure exerted by the roll 36 may be adjusted through the medium of control screws 37. The roll 36 is relatively cool in order that the resin particles will not adhere thereto. Under certain circumstances, as for example where a relatively soft resinous material is used, it may be necessary to blow air through this roll or apply other suitable cooling means thereto.

As the glass plates emerge from the pressure rolls and advance upon conveyor rolls 39, every alternate plate is removed from the conveyor, inverted in position, and placed upon the next plate so that the resin layers on the two plates come together preliminary to the laminating operation. This is the preferred method of operation at this point, although if desired, the operation may be conducted merely by placing plates of glass to which a resin layer has not been attached over the resin layers of the plates carried by the conveyor. In this case, the thickness of the resin layer applied to the glass plates passing through the apparatus will necessarily be twice that required in the preferred embodiment of my invention in which each plate carries one-half of the resin interlayer.

It is now necessary to colloid the resin layer between the glass plates and bring such plates to completely laminated condition. In order to accomplish this result, the sandwiches must be subjected to a considerable amount of heat and pressure. This operation may be carried out in the open air, but it is preferably performed in a vacuum chamber so that the resin layers between the glass plates are subject to suction, in order to remove the air which is distributed through the layers. In this way it will be certain that no bubbles will remain in the interlayer when the pressing operation is completed. One form of vacuum chamber for accomplishing this result is shown in detail in Figure 3.

The vacuum chamber is preferably made in the form of three compartments with partitions therebetween permitting a better vacuum to be maintained in the central compartment wherein the major portion of the laminating operation is performed. The two end compartments 40 are sealed by pairs 41 of soft rolls which engage the glass plates advancing therebetween through the medium of a resilient or spring mounting and close to engage each other during the interval at which no composite plate is advancing. The space between the rolls and the ends of the chambers 40 is sealed by flexible lips 42. The end compartments 40 are separated from the central compartment 44 by partitions 45, illustrated in detail in Figure 5.

Each of the partition plates 45 is provided with a flexible lip 46 for engaging the glass sheets or to contact each other at the spaces between the glass plates, in order to maintain the independence of the chambers. The flexible lips 46 may be formed of rubber or other resilient material having a plurality of projections upon their forward face to insure a satisfactory seal. In the modification shown in Figure 6, the edges of the partition plates 45 are provided with sealing sections 47 which are in the form of hollow flexible tubes capable of being expanded by air pressure applied to the interior thereof.

The three chambers are provided with suction pipes 48 connected to vacuum tanks 49 which are exhausted by means of pumps 50. The exhaust gases are preferably conducted through coils 51 lying in containers 52 through which water is circulated through conduits 53 in order to cool the gases before they reach the vacuum tanks 49.

Reflector heaters 55 are provided above and below the travel of the glass in the vacuum chambers, in order to give the necessary temperature for colloiding the resin interlayer, such temperature being in the neighborhood of 220° F. The pressure to which the composite plates must be subjected in order to complete the lamination is provided by a series of pairs of pressure or nipper rolls 56, which have their surfaces covered with a resilient material such as rubber, to prevent fracture of the glass plates. The pressure exerted by the rolls 56 may be controlled by adjustable screws 57. As shown in Figure 4, each of the conveyor rolls 39 and the pressure rolls 56 is provided with a resilient sealing member 58 supported from the wall of the chamber. The member 58 engages the axle of the roll and prevents the entrance of air at that point.

The laminated plates, as they emerge from the vacuum chamber are received upon a conveyor 60 which advances them to a position at which they may be received by an operator and placed upon suitable racks 61, thus completing the operation. If desirable these plates may be subjected to a further hydraulic pressing employing the method set forth in the Sherts and Hamill Patent No. 1,781,084.

Figures 7-10 illustrate a modification wherein a hydraulic press takes the place of that part of the apparatus shown in Figure 3 and heretofore described. This press provides the necessary heat and pressure for colloiding the resin interlayer between the glass plates and compacting it.

The composite glass sheets 65 are brought to the press upon the conveyor rolls 39 past the heaters 32, the delivery operation being an intermittent one since the operation of the press is intermittent. The upper platen 66 of the press is supported in fixed position from a framework 67, while the bottom platen is moved in a vertical plane by a plurality of plungers 69 activated by the hydraulic cylinders 70. The fluid necessary for the operation of the cylinders 70 is admitted thereto or released therefrom through conduits 71. Both platens are heated by means of steam which circulates through passages 72 contained therein, supplied from the connections 73.

It is desirable in this pressing operation to exhaust the air from the space between the platens during the pressing operation, and in order to accomplish this result, an exhaust pipe 74 is provided leading to a suitable exhausting apparatus. In order to provide a seal between the platens during the pressing and exhausting operation, the upper platen is preferably provided with a sealing strip 75 (Figs. 9 and 10) of rubber extending around the periphery of the platen. This strip is grooved, as indicated at 76, in order to improve the seal. In order to carry the sandwiches into the press, a belt 78 is employed carried at its edges by the chains 79 riding on suitable supports 80 carried by the lower platen, as indicated in Figs. 9 and 10. The belt 78 may be of rubber or copper mesh or thin sheet metal. The chains pass around suitable pulleys 81 and 82, secured to shafts 83 mounted in suitable bearing 84 in the press frame, one of which is driven to give the belt its necessary intermittent travel into and out of the press.

After a sandwich has been carried into the press, the lower platen is moved up to seal the pressing chamber and apply the necessary pressure to the sandwich, at which time the air in the pressing chamber is exhausted through the pipe 74. The heated platens supply the necessary heat for colloiding the sheet during the pressing operation. A temperature of 220 deg. F. and a pressure of about 150 pounds per square inch is preferably employed, although these conditions may vary within a considerable range, depending upon the character of the resin and the time period to which the sandwich is subjected.

When the pressing operation is completed, the platen 68 is lowered and the sandwich is moved out of the press by the belt and onto the driven conveyor rolls 85, thus completing the operation. It is also possible to use this apparatus without the sealing members 75 as a substitute for the pressing and smoothing rolls 34 and 36 of the Fig. 1 construction. When the press is used in this way, it is necessary to prevent the resin on the glass plates from adhering to the upper platen 66, and this platen is, therefore, cooled by a circulation of water therethrough instead of being heated. In using the apparatus of Figs. 7 and 8, the operation of the conveying means throughout is necessarily intermittent instead of continuous as in the construction of Fig. 1. The apparatus of Figs. 7 and 8 presents one advantage over that of Fig. 1, in that it is easier to maintain vacuum conditions in the pressing chamber than is the case with the apparatus of Fig. 1.

What we claim is:

1. Apparatus for making safety glass comprising a conveyor for the glass plates, means for feeding a layer of finely divided plasticized resin onto the plates as they move along the conveyor, means for heating the plates and the resin layer thereon to cause the resin particles to adhere to each other and to the plates, presser means above the line of travel of the conveyor for compacting and smoothing the layers of resin on the plates, and heating and pressing means along the further line of travel of the conveyor which heat the plates and press them after they have been assembled with the resin layers therebetween.

2. Apparatus for making safety glass comprising a conveyor for the glass plates, means for feeding a layer of finely divided plasticized resin onto the plates as they move along the conveyor, means for heating the plates and the resin layer thereon to cause the resin particles to adhere to each other and to the plates, presser means above the line of travel of the conveyor for compacting and smoothing the layers of resin on the plates, a vacuum chamber enclosing the conveyor in advance of the heating and pressing means, means for exhausting the air therefrom, and means for applying heat and pressure to the assembled plates with the resin layers therebetween in said chamber.

3. Apparatus for making safety glass comprising a conveyor for the glass plates, means for feeding a layer of finely divided plasticized resin onto the plates as they move along the conveyor, means for heating the plates and the resin layer thereon to cause the resin particles to adhere to each other and to the plates, a polished presser roll above the line of travel of the conveyor adapted to compact and smooth the layers of resin on the plates and heating and pressing means along the further line of travel of the conveyor which heat the plates and press them after they have been assembled with the resin layers therebetween.

4. Apparatus for making safety glass comprising a conveyor for the glass sheets consisting of a series of driven rolls for carrying the glass plates to be laminated, means for feeding a layer of finely divided plasticized resin onto the plates as they move along the conveyor, means for heating the plates and the resin layer thereon to cause the resin particles to adhere to each other and to the plates, a presser roll in opposition to one of the conveyor rolls for compacting and smoothing the layers of resin on the plates, heating means for the plates along the further line of travel of the conveyor and a series of presser rolls in opposition to the rolls of the conveyor adjacent such last heating means.

5. Apparatus for making safety glass comprising a conveyor for the glass sheets consisting of a series of driven rolls for carrying the glass plates to be laminated, means for feeding a layer of finely divided plasticized resin onto the plates as they move along the conveyor, means for heating the plates and the resin layer thereon to cause the resin particles to adhere to each other and to the plates, a presser roll in opposition to one of the conveyor rolls for compositing and smoothing the layers of resin on the plates, a vacuum chamber through which the conveyor extends, means for exhausting the air therefrom, heating means for the plates in said chamber, and a series of presser rolls in the chamber in opposition to the conveyor rolls.

6. Apparatus for making safety glass comprising a conveyor for the glass plates, means for feeding a layer of finely divided plasticized resin onto the plates as they move along the conveyor, means for heating the plates and the resin layer thereon to cause the resin particles to adhere to each other and to the plates, presser means above the line of travel of the conveyor for compacting and smoothing the layers of resin on the plates, a belt conveyor in advance of said presser means, a press through which the belt passes comprising a pair of opposing platens, one of which is movable toward the other, means for heating the platens, and power means for operating the movable platen.

7. Apparatus for making safety glass comprising a conveyor for the glass plates, means for feeding a layer of finely divided plasticized resin onto the plates as they move along the conveyor, means for heating the plates and the resin layer thereon to cause the resin particles to adhere to each other and to the plates, presser means above the line of travel of the conveyor for compacting and smoothing the layers of resin on the plates, a belt conveyor in advance of said presser means, a press through which the belt passes comprising a pair of opposing platens, one of which is movable toward the other, means for heating the platens, hydraulic means for operating the movable platen, and means for exhausting the air from the space between the platens during the pressing operation.

JAMES H. SHERTS.
BROOK J. DENNISON.